(No Model.) 2 Sheets—Sheet 1.

S. J. ADKINS.
CORN OR COTTON PLANTER ATTACHMENT.

No. 487,941. Patented Dec. 13, 1892.

Witnesses
Chas. H. Durand
John M. Driggers

By his Attorneys,
C. A. Snow & Co.

Inventor
S. J. Adkins.

THE NORRIS PETERS CO., PHOTO-LITHO., WASHINGTON, D. C.

(No Model.) 2 Sheets—Sheet 2.
S. J. ADKINS.
CORN OR COTTON PLANTER ATTACHMENT.
No. 487,941. Patented Dec. 13, 1892.
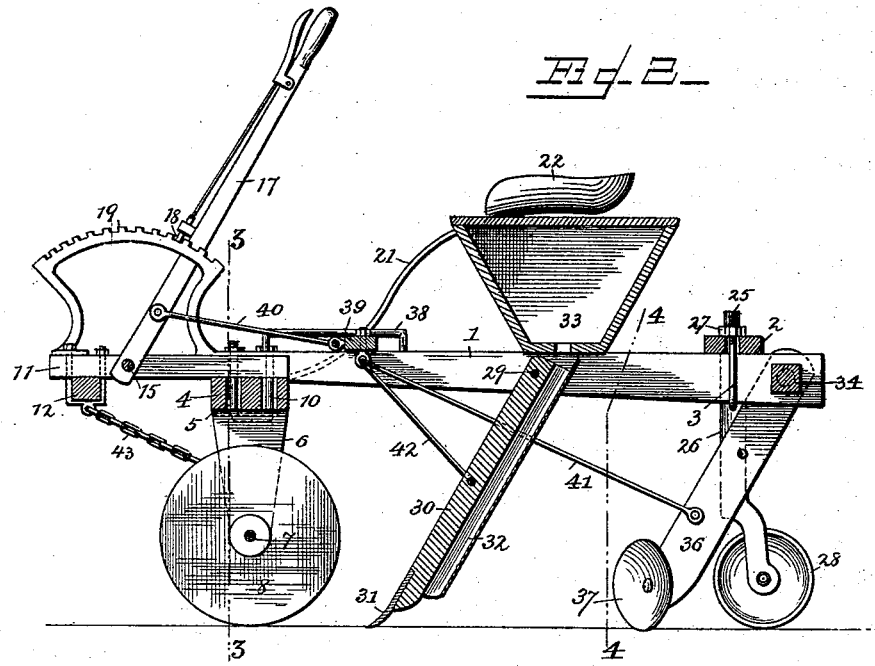
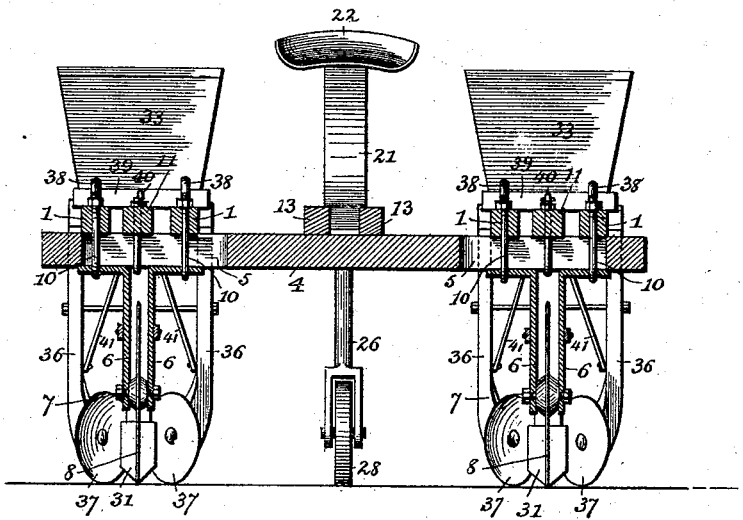

UNITED STATES PATENT OFFICE.

STEPHEN J. ADKINS, OF GRAND VIEW, TEXAS.

CORN OR COTTON PLANTER ATTACHMENT.

SPECIFICATION forming part of Letters Patent No. 487,941, dated December 13, 1892.

Application filed July 6, 1892. Serial No. 439,108. (No model.)

*To all whom it may concern:*

Be it known that I, STEPHEN J. ADKINS, a citizen of the United States, residing at Grand View, in the county of Johnson and State of Texas, have invented a new and useful Corn and Cotton or any Seed Planter Attachment, of which the following is a specification.

My invention relates to improvements in planters, the objects of the same being to provide a planter adapted to simultaneously plant two rows at a desired distance apart, to provide means for raising and lowering the planting mechanism, whereby the same may be thrown into and out of operation, and to provide means for setting the plows for any desired depth of penetration.

The other objects and advantages of the invention will appear in the following description, and the novel features thereof will be particularly pointed out in the claims.

Figure 1:
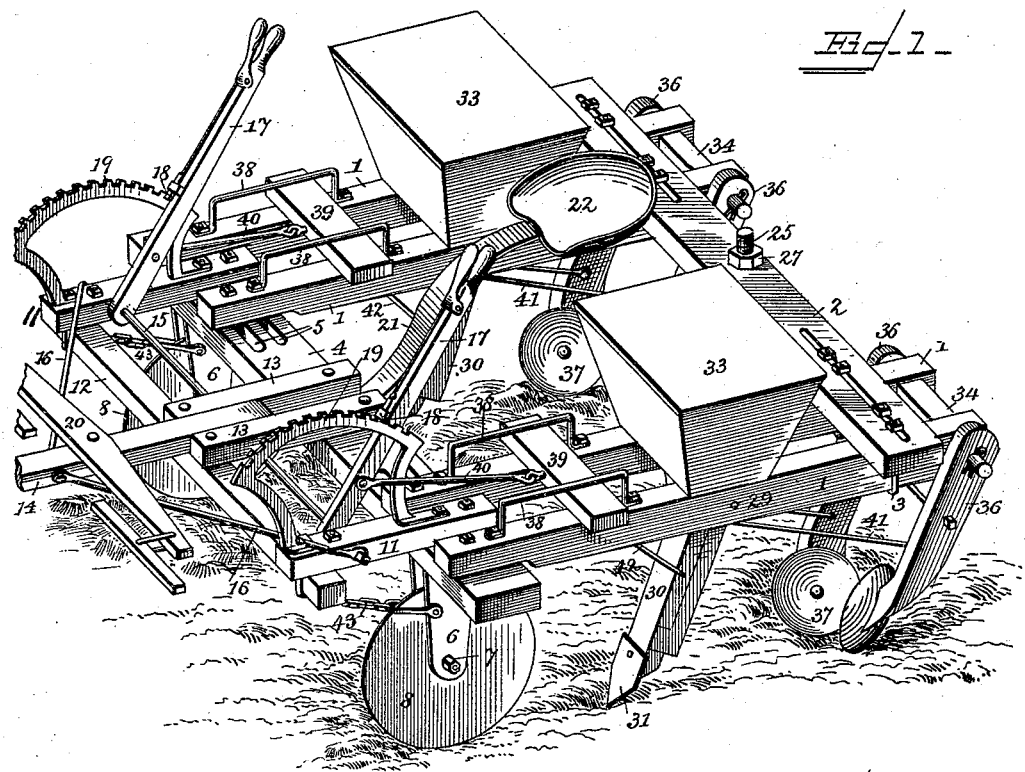
Figure 4:
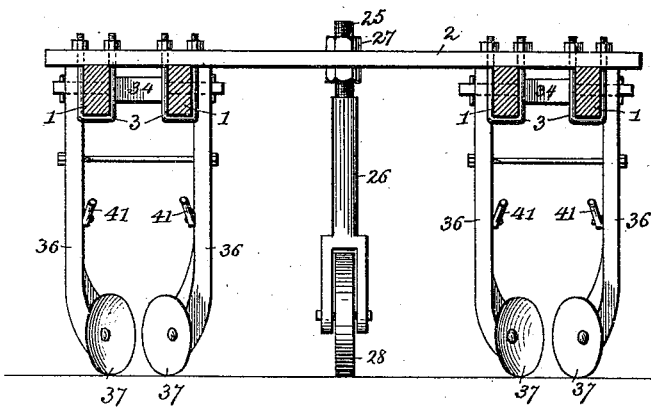

Referring to the drawings, Figure 1 is a perspective view of a planter embodying my invention. Fig. 2 is a vertical longitudinal section through one of the hoppers. Fig. 3 is a transverse section through the front transverse frame-bar on the line 3 3 of Fig. 2. Fig. 4 is a similar section in front of the covering-disks on the line 4 4 of Fig. 2.

Like numerals of reference indicate like parts in all the figures of the drawings.

In practicing my invention I employ opposite pairs of side frame bars or beams 1 and arrange the bars of each pair a suitable distance apart. These bars at their rear ends support a rear transverse frame-bar 2, which latter is secured in position adjustably by means of U-shaped clips 3, each of which embraces the bar 1 and projects upwardly through slots formed in the bar 2, near the the ends of the latter. The front ends of the bars 1 rest upon the upper side of a transverse frame-bar 4, which latter is provided near its ends with pairs of longitudinal slots 5. Pairs of L-shaped brackets 6 are secured to the under side of the front transverse frame-bar 4, and in the lower ends of each pair there is journaled the axle 7 of a disk or colter wheel 8, there being one of the latter, therefore, at each side of the machine. Perforations are formed in the upper longitudinal portions of the inverted-L-shaped brackets, and the same register with or are vertical below the slots 5, formed in the ends of the bars 4. The bar 4 is overlapped by the front ends of the bars 1, and U-shaped clips 10 extend upwardly through the perforations formed in the inverted-L-shaped brackets, the slots 5, formed in the bar 4, and perforations formed in the bars 1, above which latter said clips are nutted. By loosening the nuts it will be obvious that the bars 1 may be slid inward toward each other or outward away from each other, and thus, as will be hereinafter apparent, the machine will be adapted to plant at a desired distance apart. A pair of extension-bars 11 project from the bar 4 between the side bars 1 and the same are connected at their lower front ends by a transverse bar 12. Upon the upper side of bar 4 and the bar 12 is located the cleats 13, between which the draft-pole 14 is pivoted. The draft-pole has passed therethrough a transverse rod 15, whose ends pass through transverse openings formed in the bars 11. Braces 16 have their rear ends connected to the transverse rod 15 and their front ends converged and connected with the draft-pole so as to brace the latter. A pair of levers 17 have their lower ends pivoted on the rod 15 and are provided at one side with dogs 18 for engaging with the teeth of curved toothed locking standards 19, one of which is mounted upon each of the extension-bars 11. The draft-pole 14 carries the usual doubletree 20, and from the center of the bar 4 there rises and rearwardly extends a seat-standard 21, upon the upper end of which a seat 22 for the accommodation of the driver is mounted.

The rear transverse frame-bar 2 is provided with an opening at its center, through which extends the upper threaded reduced end 25 of an ordinary caster-shank 26, which is provided with an adjusting-nut 27, and at its lower end has journaled therein the axle of the wheel 28, which serves to support the rear end of the machine, and by whose adjustment by means of a nut the rear end of the frame and consequently the parts carried thereby, and hereinafter described may be raised and lowered.

Between each pair of bars 1, about midway the same, there is pivoted at 29 the upper end of the standard 30. This standard is provided at its lower end with a furrow-opening shovel 31, and in rear of the same with a seed-tube 32, which latter is directly below the discharge-opening in an ordinary seed-hopper 33, one of which latter is mounted upon each pair of side bars 1. Transverse rock-shafts 34 are journaled in the rear ends of the side bars 1, and the outer extremities of the rock-shafts extend beyond said side bars where they pass through and are loosely connected with pairs of depending standards 36. These standards have their lower ends inwardly disposed and each carries a covering disk or wheel 37, which by reason of the deflection given to the standards causes their inner faces to converge. Pairs of inverted-U-shaped guides 38 are mounted upon the bars 1 and each pair accommodates a sliding cross-head 39, which cross-head is connected by a rod 40 with one of the levers 17. Rods 41 connect the cross-heads with the standards 36, and rods 42 connect the standards 30 with the cross-heads, so that movements upon the part of the levers and the cross-heads are communicated to the three standards at each side of the machine. Draft-chains 43 connect the brackets 6 with the cross-bar 12, whereby the brackets are prevented from becoming strained.

From the foregoing description the operation of the invention will be seen to be as follows: As the machine moves along the seed drops from the hopper either by gravity or through any feed mechanism that may be desired to be employed, the front shovels serving to open the furrows. The seed will be deposited by the seed-tubes in the bottom of the furrows and the covering-disk following after by reason of their convergence will serve to return the earth to the furrows, thus covering up the seed and the planting is completed. In this way two rows of seed may be simultaneously sown in an effectual manner. The disks traveling in advance of the furrow-opening shovels will cut the turf and render the operation of opening the furrows easier. By throwing the hand-levers to the front it will be seen that the slides are moved in the guides and thus the series of standards at each side of the machine will be elevated out of operative position and the planting will cease. Through the medium of the adjustable caster the depth of penetration of the shovels and disks may be regulated. Thus it will be seen that I have provided a machine of great simplicity, strength, and durability that may be adjusted loosely, so as to plant at various distances apart, and which will cut the turf from the furrow, deposit the seed, and re-cover the furrow all in one continuous operation.

Having described my invention, what I claim is—

1. In a machine of the class described, the combination, with the opposite pairs of side bars, the front and rear slotted connecting-bars, the U-shaped adjusting devices connecting the side bars and cross-bars and mounted in the slots of the connecting-bars, the shovel-carrying standards pivoted between each pair of side bars and having seed-tubes, the hoppers mounted on the side bars and connecting with the tubes and the rear pairs of standards carrying pairs of converging covering-disks pivoted at the rear ends and to the outer side of the side bars, substantially as specified.

2. In a machine of the class described, the combination, with the opposite pairs of side bars, the front and rear slotted cross-bars, the inverted-L-shaped brackets located under the front cross-bar, disks journaled in the brackets, the U-shaped staples passed through perforations in the brackets through the front cross-bar and front ends of the side bars, similar staples embracing the side bars and passed through slots in the rear cross-bar, and adjusting-nuts for the same, of hoppers mounted on each pair of side bars, opposite shovel-carrying standards secured between each pair of side bars, seed-tubes secured to the same and engaging with the hoppers, and rear pairs of furrow-closers located at the rear ends of the side bars, substantially as specified.

3. In a machine of the class described, the combination, with the opposite side bars, the front and rear cross-bars, the wheels at the front and rear ends of the machine, the opposite guides mounted on the side bars, cross-heads mounted for sliding in the guides, levers pivoted on the front end of the machine, means for locking the levers, and connecting-rods between the levers and cross-heads, of a pair of shovel-carrying standards pivoted between the side bars, rods connecting the same with the cross-heads, a superimposed hopper, shafts passed through the side bars and extending beyond the same, standards mounted on the shafts and carrying furrow-closing shafts, and rods connecting the latter standards with the cross-heads, substantially as specified.

4. In a machine of the class described, the combination, with the opposite pairs of side bars, front and rear cross-bars, guides mounted on the side bars, cross-heads mounted for sliding in the guides, front standards pivoted between the side bars, rear standards at the rear ends of the side bars and intermediate hoppers, and rods between the standards and cross-heads, of front extension-bars extending from the front cross-bar, a transverse rod connecting the two levers pivoted on the rod, means for locking the levers, rods connecting the levers with the cross-heads, and a tongue pivoted on the rod, substantially as specified.

In testimony that I claim the foregoing as my own I have hereto affixed my signature in the presence of two witnesses.

STEPHEN J. ADKINS.

Witnesses:
LEE. A. WALKER.
A. C. CAIN.